(No Model.)

W. O. TAYLOR.
ROLLING PIN.

No. 353,177. Patented Nov. 23, 1886.

WITNESSES.
Frank G. Parker.
Helen M. Fregau.

INVENTOR.
William O. Taylor

UNITED STATES PATENT OFFICE.

WILLIAM O. TAYLOR, OF SOMERVILLE, MASSACHUSETTS.

ROLLING-PIN.

SPECIFICATION forming part of Letters Patent No. 353,177, dated November 23, 1886.

Application filed November 30, 1883. Serial No. 113,234. (No model.)

*To all whom it may concern:*

Be it known that I, WILLIAM O. TAYLOR, of Somerville, in the county of Middlesex and State of Massachusetts, have invented certain new and useful Improvements in Rolling-Pins, of which the following is a specification.

This invention has for its object to provide an ordinary rolling-pin employed by pastrycooks, &c., for reducing sheets of dough or other material to a uniform thickness, with devices by which the acting periphery of the roll may be more or less raised from contact with the usual table or board.

In accordance with this invention the journals at each end of the roller each have loosely connected with them a yoke or frame carrying suitable supports (herein shown as rollers) and a lever forming a component part of said frame, by which the latter is moved relative to the main roller by the hand of the operator. Suitable devices are supplied for regulating the distance the acting periphery of the main roller shall rise with relation to the surface of the table.

The invention consists in the combination, with the main roller, its journals, and bearings for the journals, of a pivoted frame having suitable supports to rest upon the table and a hand-lever, movement of the latter by the hand of the operator raising or lowering the acting periphery of the main roller, to thereby regulate the thickness of the material to be operated upon.

Figure 1:
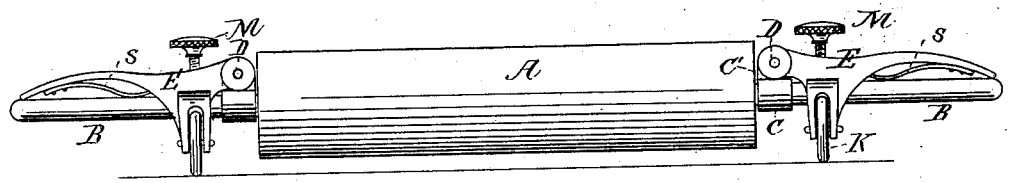
Figure 2:
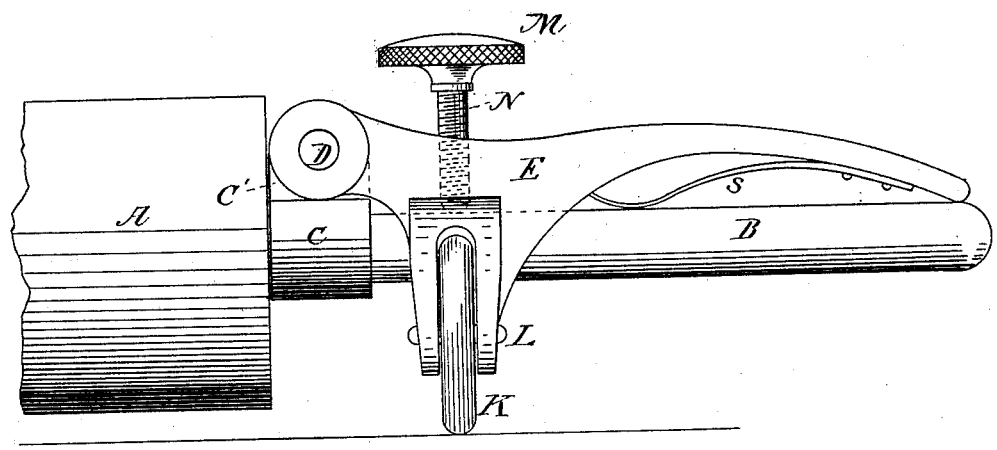
Figure 3:
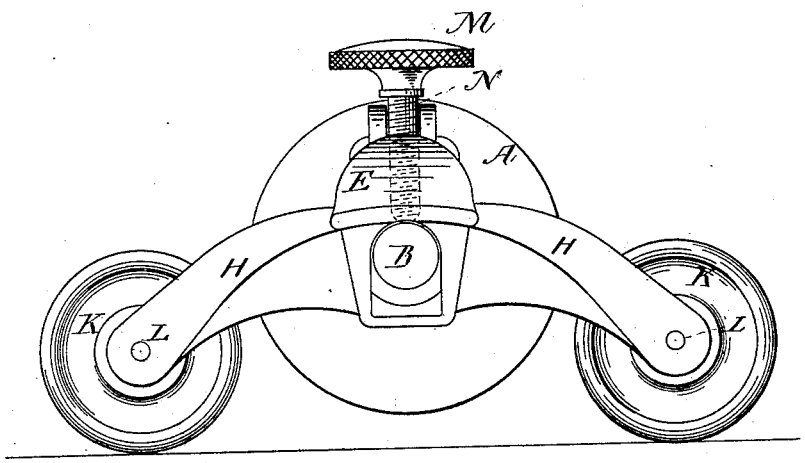

Figure 1 shows in elevation a rolling-pin with my adjusting device applied thereto; Fig. 2, a similar yet enlarged view of a portion of Fig. 1, and Fig. 3 an end view of Fig. 2.

The main roller A, having journals B B, is formed as usual, and the devices herein to be described are applied to each journal, and are alike, so only one need be described. The journal B is mounted to rotate freely in a bearing, C, (herein shown as a sleeve,) or it may, if desired, be only a loop. The bearing C is provided with ears C', to which, by a pin, D, a frame or yoke is pivoted, said frame consisting of the lever E, lying parallel with the journal B, and two arms, H H, extending in opposite directions and at substantially right angles to the said lever E. The ends of the arms H H carry supports, (herein shown as rollers K K,) held therein by pins L L. A spring, S, is attached to the under side of the lever E, the free end thereof bearing upon the journal B, to thereby normally keep the said lever in elevated position and the acting periphery of the main roller in contact with the table upon which the apparatus may be placed. The supports or rollers K K sustain the frame in place, they also bearing on the table.

When it is desired to use the apparatus, the operator grasps the lever E, depressing it, and as the supports or rollers K K bear firmly upon the table as a fulcrum the bearing C is caused to rise, carrying with it the main roller until the journal thereof comes in contact with or bears upon the under side of the frame.

When it is desired to limit the rising movement of the main roller or to regulate the same, an adjusting-stop, N, supplied with a head, M, having a milled edge, is passed down through the frame from above, so that as the main roller is raised by its journal its upward movement is checked by the journal striking the adjusting-stop, limiting the rising movement of the main roll at any point desired.

When it is desired to employ the main roller independent of the adjusting devices—as, for instance, in crossing a sheet of dough or other material—the entire frame may be thrown up by the action of the spring S, so that the supports or rollers K K are freed from contact with the table or surface when the said main roller K is rotated either by the journals B B or by applying the hands directly upon the roll itself.

I claim—

1. A rolling-pin having journals, and a supporting-frame for each journal, constructed and arranged to rest upon the table and to be moved in any direction, each of said supporting-frames carrying bearings in which said journals revolve, combined with adjusting devices, substantially as described, to adjust the said supporting-frames with relation to the axis of rotation of the said journals, all as set forth.

2. The main roll A, provided with journals and bearings to receive the said journals, combined with a frame pivoted to the bearings, and having a hand-lever, E, provided with supports to rest upon the table, action of the hand upon the said lever raising or lowering the acting periphery of the main roll A, to regulate the thickness of the material to be rolled, substantially as described.

3. The roll A, its journals and bearings for said journals, and the frame pivoted to the bearings, and consisting of the arms H H, hand-lever E, and the roller-supports K K, combined with an adjusting device, substantially as described, to regulate the distance that the acting periphery of the roll A may rise above the table, all substantially as and for the purpose set forth.

4. The roll A, its journals and bearings for said journals, and the frame pivoted to the bearings, and consisting of the arms H H, hand-lever E and its spring, and the roller-supports K K, combined with an adjusting device, substantially as described, to regulate the distance that the acting periphery of the roll A may rise above the table, all substantially as and for the purpose set forth.

WILLIAM O. TAYLOR.

Witnesses:
HELEN M. FEEGAN,
FRANK G. PARKER.